United States Patent
Ohta et al.

[11] Patent Number: 5,309,548
[45] Date of Patent: May 3, 1994

[54] PATTERN GENERATING METHOD AND APPARATUS

[75] Inventors: Takatoshi Ohta; Nobuo Ohnuma, both of Yokohama, Japan

[73] Assignee: Canon Kabushiki Kaisha, Tokyo, Japan

[21] Appl. No.: 90,624

[22] Filed: Jul. 12, 1993

Related U.S. Application Data

[63] Continuation of Ser. No. 584,647, Sep. 19, 1990, abandoned.

[30] Foreign Application Priority Data

Sep. 21, 1989 [JP] Japan .................. 1-243361
Sep. 27, 1989 [JP] Japan .................. 1-249203

[51] Int. Cl.$^5$ .......................... G06F 15/00
[52] U.S. Cl. .................... 395/109; 395/110
[58] Field of Search ............... 395/101, 102, 109, 110, 395/115, 116, 129, 131, 132, 150, 151, 164, 128; 345/186, 192, 194, 731; 346/154, 157, 76 PH; 382/47, 54; 358/461, 451

[56] References Cited

U.S. PATENT DOCUMENTS 4,368,491 6/1983 Saito .................. 346/76 PH
4,716,533 12/1987 Ohmori .................. 395/101
4,907,282 3/1990 Daly et al. .................. 340/731

Primary Examiner—Arthur G. Evans
Attorney, Agent, or Firm—Fitzpatrick, Cella, Harper & Scinto

[57] ABSTRACT

There are provided a pattern generating method and apparatus for generating a character/symbol pattern. The apparatus comprises a font memory to store outline font data of characters, symbols, and the like, an image memory to store image data based on the outline font data stored in the font memory, storing means for storing the font image based on the outline font data into the image memory, a color data generating circuit to generate color data in accordance with the designated color information, and a painting circuit to paint the inside of the stored font image by the color data. The color data generating circuit executes a masking operation on the basis of the color information which was designated and input and generates the color data. Thus an accurate color image can be reproduced.

14 Claims, 14 Drawing Sheets

PATTERN GENERATING METHOD AND APPARATUS

This application is a continuation of application Ser. No. 07/584,647 filed Sep. 19, 1990, now abandoned.

BACKGROUND OF THE INVENTION

1. Field of the Invention

The present invention relates to both a pattern generating method and an apparatus for generating a character symbol pattern.

2. Related Background Art

In recent years, in a recording device such as a printer or the like, there has been provided a device for generating a character pattern in which rotation, enlargement, or reduction of a character can be performed without compromising the quality of the printed character. Such a pattern is called an outline font. A character pattern is not stored as a dot image but rather, as data in the form of coordinates indicative of the outline of the character pattern is stored.

To generate a character pattern, the coordinate data is read out and the outline of the character pattern is formed by generating a straight line or a curve for a portion between the individual coordinate data or by generating curves which can approximate a plurality of coordinate data groups, and the inside of the outline is painted by dots. In the case of printing by a dot image generated from the pattern generating apparatus, a high quality character can be obtained for an image which has been rotated, enlarged, reduced, or the like.

However, in the case of connecting a different printer to such a kind of pattern generating apparatus, no problem occurs if their print resolutions are equal but if the resolution of the printer is different from that of the pattern generating apparatus, a size of character printed becomes variable. To prevent such a problem, hitherto, a pattern generating apparatus (means) having a individual outline font must be prepared for every different recording device.

A conventional color printer has been constructed in a manner such that three color inks of yellow, magenta, and cyan, or four color inks including a black ink also are mixed on a storing medium by changing a ratio for the designated color data, thereby recording in the designated color.

However, in general, since such an output device doesn't have color correcting means, there is a drawback such that in spite of the fact that the same color was designated, the color of the character displayed on a CRT and the color of the character which was output by the output device differ.

SUMMARY OF THE INVENTION

In consideration of the above problems, it is an object of the invention to provide a pattern generating method and apparatus in which the inside of an outline of a character or a symbol which was generated by using an outline font data is painted by a color according to a designated correction value, so that accurate color reproduction can be realized.

In consideration of the above problems, another object of the invention is to provide a pattern generating method and apparatus, comprising storing means for storing a font image based on outline font data into an image memory, color data generating means for generating color data in accordance with the designated color information, and painting means for painting the inside of the font image stored in accordance with the color data.

In consideration of the above problems, still another object of the invention is to provide a pattern generating apparatus in which even if the apparatus is connected to a recording device having a different resolution, a character of a desired size can be recorded without changing the construction of the apparatus itself.

In consideration of the above problems, a further object of the invention is to provide a pattern generating method and apparatus comprising memory means for storing a data group in a coordinate form for each character or symbol in order to obtain a pattern of the character or symbol, inputting means for inputting a resolution of a recording device, and outputting means for correcting the data in the coordinate form stored in the memory means and for outputting a character pattern of the number of constructing dots according to the input resolution to the recording device.

DETAILED DESCRIPTION OF THE PREFERRED EMBODIMENTS

An embodiment according to the present invention will be described in detail hereinbelow with reference to the drawings.

Figure 1:
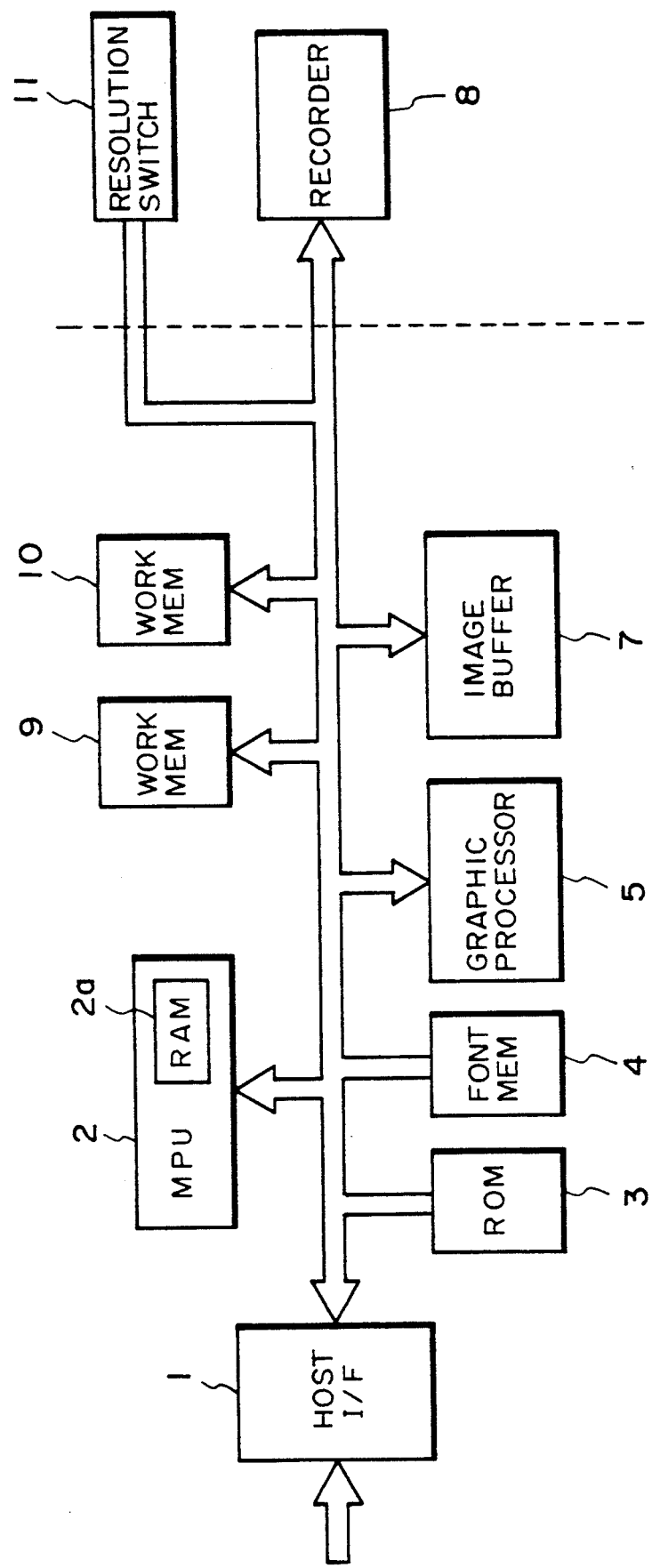
FIG. 1 is a block constructional diagram of a pattern generating apparatus according to an embodiment.

FIG. 1 shows a block constructional diagram of a printer in the embodiment.

In the diagram, reference numeral 1 denotes a host interface to input print data from a data generating source such as a host computer or the like. Reference numeral 2 indicates an MPU to control the whole apparatus. A RAM 2a provided in the MPU 2 is used as a work area. A processing procedure (program) shown in FIG. 7 which will be explained hereinafter, has been stored in a ROM 3. Data to generate an outline font pattern has been stored in a font memory 4. A graphic processor (GP) 5 executes a drawing process of a line and a curve, a painting process, or the like in accordance with a graphic command from the CPU 2. In the embodiment, the GP 5 is used to draw an outline when generating a character pattern and to paint the inside thereof.

Image data when printing is stored into an image buffer 7. A recorder 8 forms a visible image on a recording medium (recording paper or the like) on the basis of the image data stored in the image buffer 7. As a recorder, various devices such as ink jet printer, thermal copy transfer type printer, electrophotographic type printer, and the like can be used. A display such as a CRT can be also used.

Work memories 9 and 10 are used when generating a character pattern. The work memory 9 is used when executing a painting process on a character unit basis. An outline based on outline font data such as a character or symbol which was stored in the font memory 4 is stored in the work memory 9. A painting pattern of the inside of an outline has been stored in the work memory 10. The painting pattern of the inside of the outline can be indicated and input from the host computer or can be arbitrarily stored. Either one of these methods can be properly selected.

Reference numeral 11 denotes a resolution switch of the recorder 8. For instance, the switch 11 comprises a DIP switch or the like. The set content of the switch 11 is read by the CPU 2 through a data bus. When generating an outline font pattern, the CPU 2 generates a font pattern of the number of constructing dots corresponding to the set resolution. The resolution switch 11 can be attached on the side of the pattern generating section of the apparatus or on the side of the recorder 8. If the ink jet type (or thermal transfer copy type) printer is used as a recorder 8, the resolution switch 11 is provided on a recording head or a sensor to detect the resolution in accordance with the recording head which is provided and the set value can be automatically changed on the basis of the resolution of the recording head.

Figure 2:
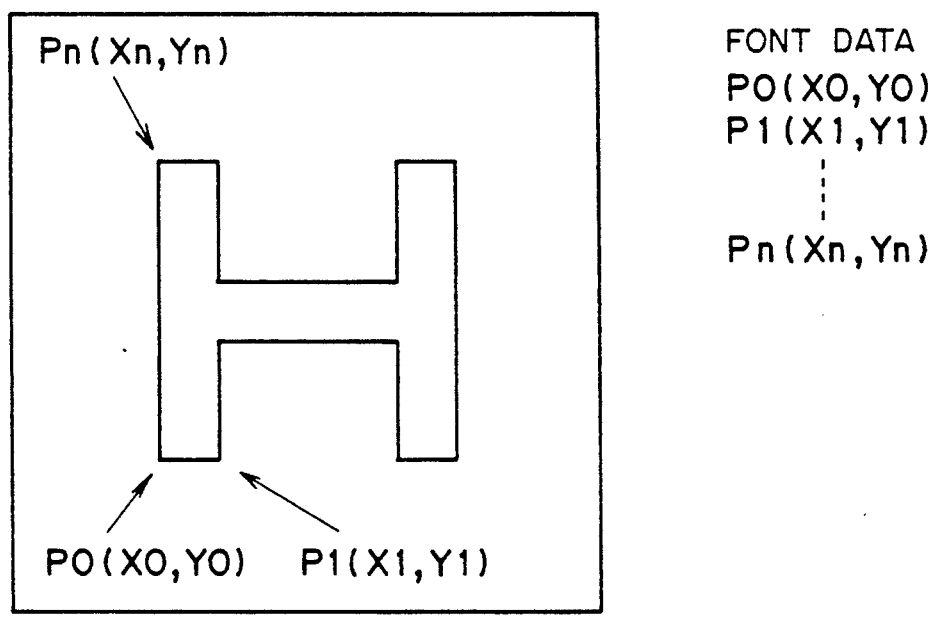
FIG. 2 is a diagram for explaining an outline font.

FIG. 2 is a diagrammatical view for explaining a structure of outline font data which is stored in the font memory 4. FIG. 2 shows the case of a character "H".

As will be also understood from the diagram, the graphic processor 5 arranges an outline path image on the basis of the outline font data into a matrix area of one character according to the resolution of the recorder 8 which has been stored in the work memory 9 by referring to vector data which uses outline points $P_0$ to $P_n$ of a character as coordinate values.

For instance, when the resolution of the recording device is set to 120 dpi (dots per inch) and the designated size of a character to be printed in set to 12 point, the matrix size of a generating character is constructed by 20×20 dots because one point corresponds to 1/72 inch. That is, in this case, a dot image of 20×20 dots is generated as an outline font pattern.

A painting pattern will now be described with reference to FIG. 3.

Figures 3A, 3B, 3C:
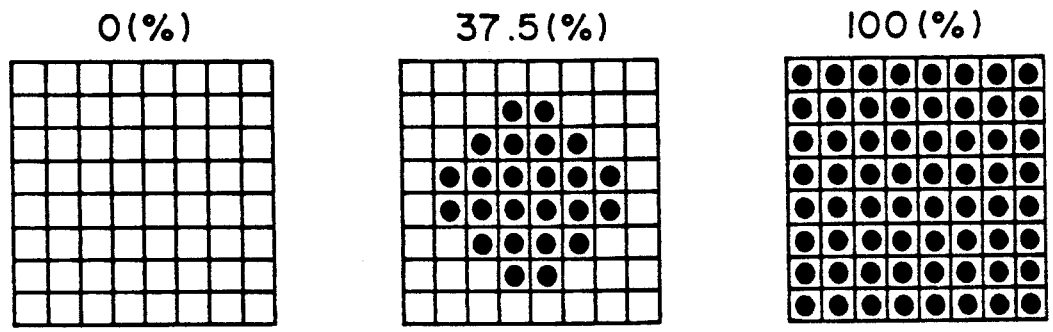
FIGS. 3A to 3C are diagrams showing painting patterns.

FIGS. 3A to 3C show painting patterns by the graphic processor 5 shown in FIG. 1. These painting patterns correspond to 0%, 37.5%, and 100% to express the gradations, respectively. Although three kinds of patterns are shown here, a further large number of kinds of patterns are prepared and a larger number of gradations can be also expressed. On the other hand, the painting pattern can be also switched and set by designating from the host computer. Further, although the painting patterns each comprising 8×8 dots have been shown in the diagrams, the matrix size can be also changed in accordance with the resolution of the recording device or by designating from the host computer.

Figure 3D:
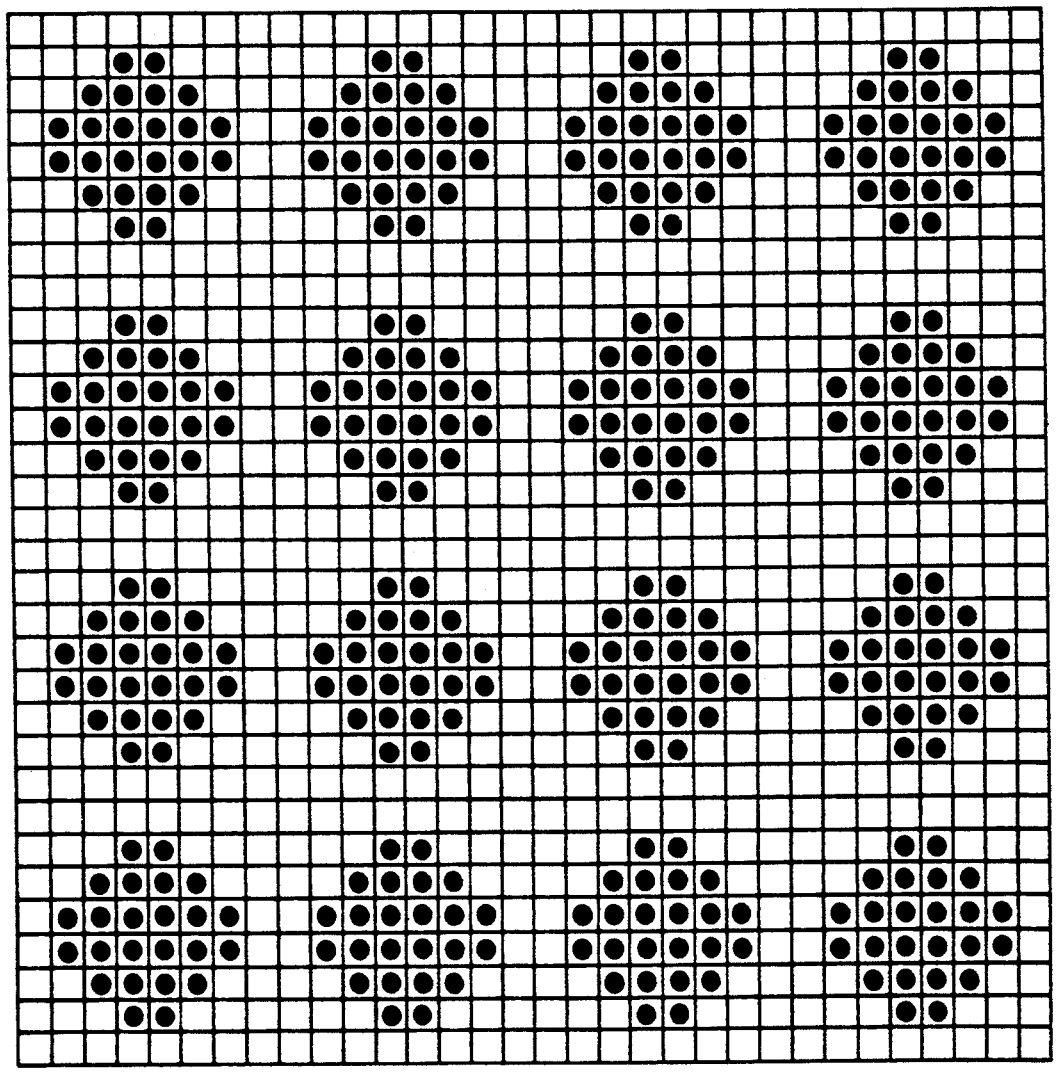
FIG. 3D is a diagram showing an example in the case where an area comprising 32×32 dots was painted by the painting pattern of FIG. 3B.

FIG. 3D is a diagram showing a state in which an area comprising 32×32 dots was painted by the painting pattern of FIG. 3B.

A dot storing process based on the outline font will now be described further in detail with reference to FIG. 4.

In the diagram, reference numeral 31 denotes a start point of an outline path. A scan path (outline) 32 is formed in the work memory 9 by painting the portion between the outline path start points 31 by dots. Further, the generation of the outline font pattern for the character "H" is completed by painting the inside of the scan paths (hatched region shown in the diagram). The coordinate data of the start points when generating the scan paths is processed by using the values which were variably magnified in accordance with the set resolution. In other words, the coordinate values of the start points stored in the font memory 4 are the coordinate data for a reference size of $S_0 \times S_0$. Therefore, if the number of constructing dots obtained by the set resolution is equal to $S_1 \times S_1$, the coordinate data which was read out of the font memory 4 is magnified by $S_1/S_0$ times and processed.

Figure 5:
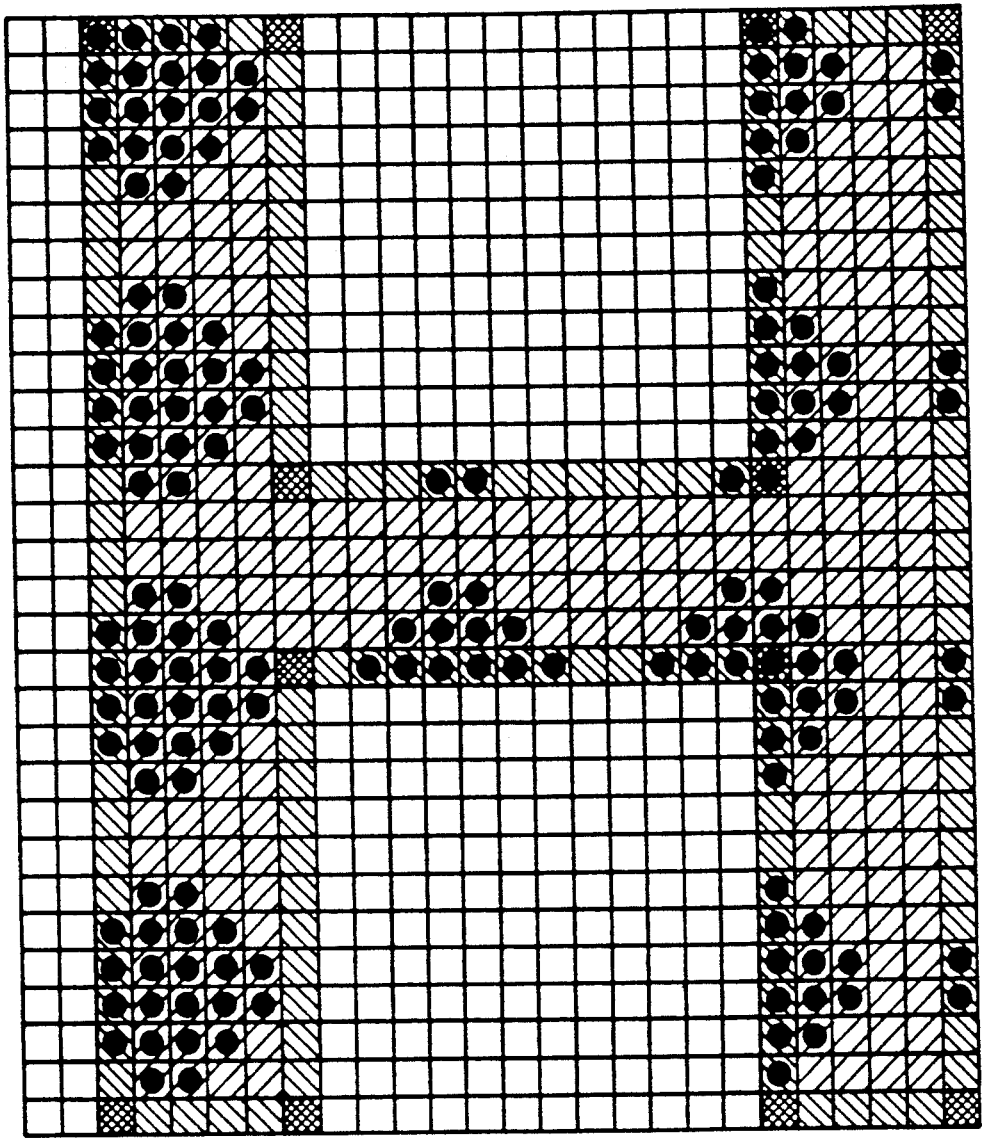
FIG. 5 is a diagram showing an example in the case where an outline font was masked by a painting pattern.

After the painting process of the inside of the outline font stored in the work memory 9 was completed by the graphic processor 5, the inside of the character "H" is painted by the designated one of the patterns of FIGS. 3A to 3C, so that a result shown in FIG. 5, for instance, is obtained. Such a process can be easily derived by, for example, calculating the AND with the painting pattern.

In FIG. 5, the portion on the outline path has also been painted by the same pattern as that of the inside of the outline path. However, the portion on the outline path and the inside thereof can be also painted by different patterns. That is, the AND with the painting pattern is calculated with respect to the inside of the outline path.

Figure 6A:
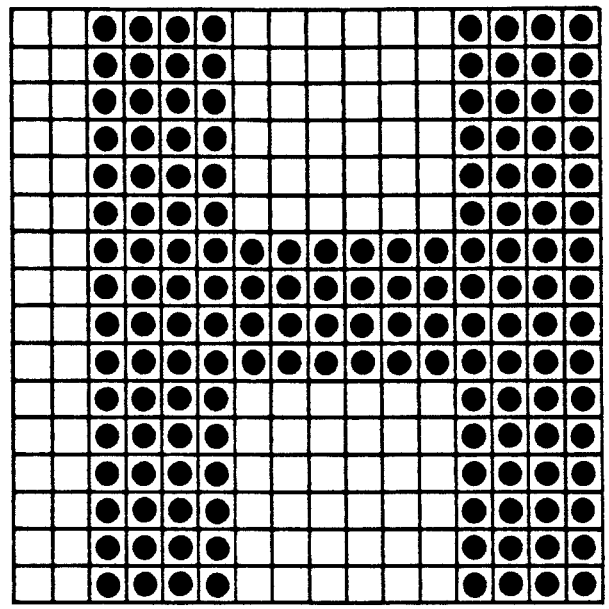
FIG. 6A is a diagram showing a character pattern to print a character of N dpi and M point.
Figure 6B:
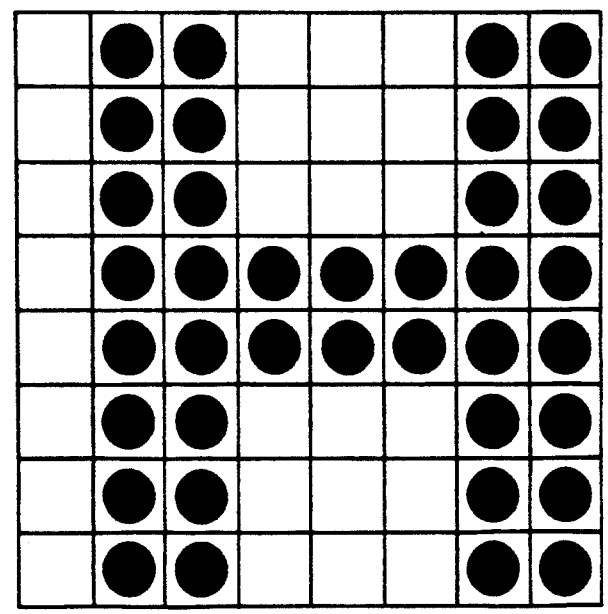
FIG. 6B is a diagram showing a character pattern to print a character of N/2 dpi and M point.

FIGS. 6A and 6B show examples in the case where the fonts of the same size were generated from the same outline font data in accordance with different resolutions. That is, FIG. 6A shows a character pattern formed in the case of printing a character of the size of M point for the recording device of the resolution of N dpi. FIG. 6B shows a character pattern formed in the case of printing a character of M point at the resolution of N/2 dpi, namely, at the half resolution.

As shown in the diagrams, in the case of FIG. 6B, since the number of dots is the half of that in FIG. 6A in each of the vertical and lateral directions, the dots are arranged on the matrix of the size of ¼ as a whole.

Figure 7:
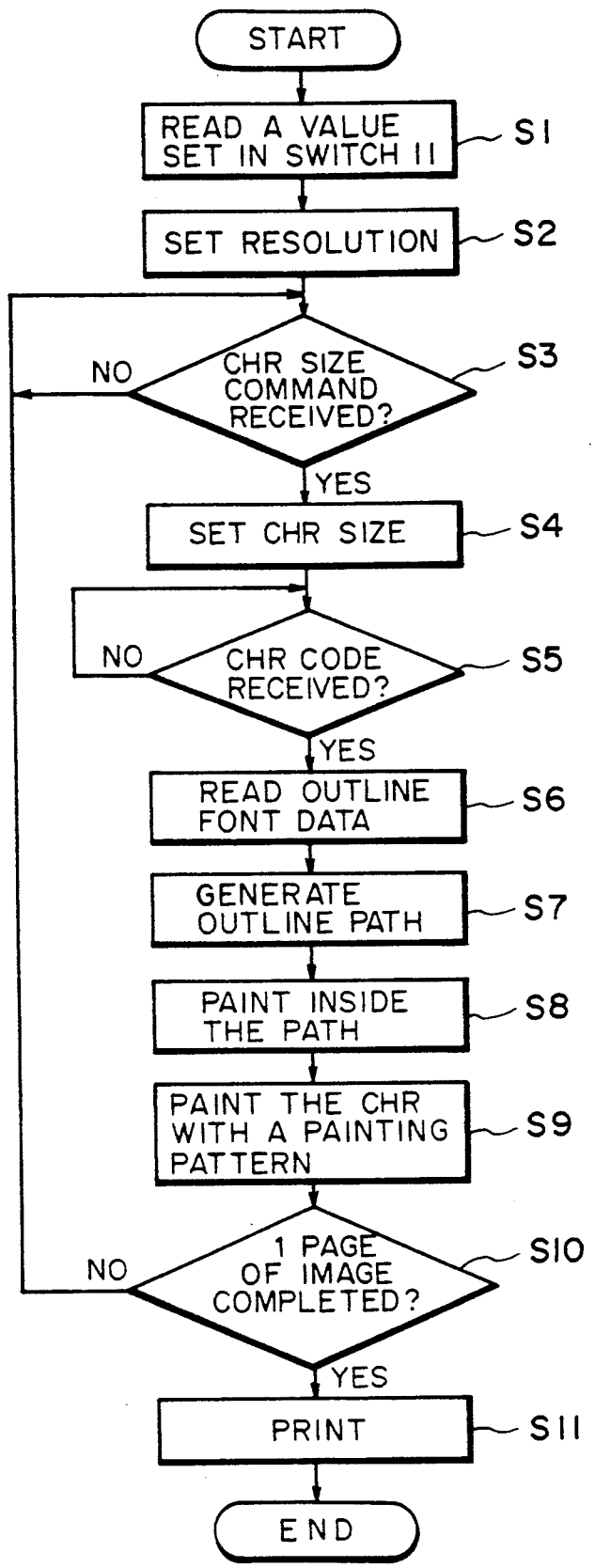
FIG. 7 is a flowchart for a pattern generating process.

An operation processing procedure of the CPU 2 in the embodiment based on the foregoing principle will now be described with reference to a flowchart of FIG. 7.

First, in step S1, the resolution set by the resolution switch 11 is read out. In step S2, the set resolution is stored in a predetermined address location in the RAM 2a in the CPU 2.

In step S3, a check is made to see if a character size setting command has been received from the host computer via the host interface 1 or not. If the character size setting command has been received, the set character size is stored in a predetermined address location in the RAM 2a in step S4.

The apparatus waits until a character code is received in step S5.

In the character code has been received, the outline font data corresponding to the received character code is read out of the font memory 4 (step S6). The matrix size is determined on the basis of the set resolution and the designated character size and the outline path of the character is generated (step S7). After that, the inside of the outline path is painted (step S8). A masking process is executed by the designated painting pattern and the pattern is stored in the corresponding location in the image buffer 7. As mentioned above, the portion on the outline path can be painted by the same pattern as that of the inside of the outline path or can be painted by another pattern. In the embodiment, the processes in steps S7 to S9 are performed by giving a command which can be executed to the graphic processor 5 from the CPU 2. However, the CPU 2 itself can also perform its process.

In the next step S10, a check is made to see if the storage of the fonts of one page has been completed or not. If NO, the image data of one page is stored in the image buffer 7 by repeating the processes in step S3 and subsequent steps. After the image data of one page was stored in the image buffer 7, step S11 follows and the data is sequentially output to the recorder 8, thereby printing the character of the set size.

Figure 8:
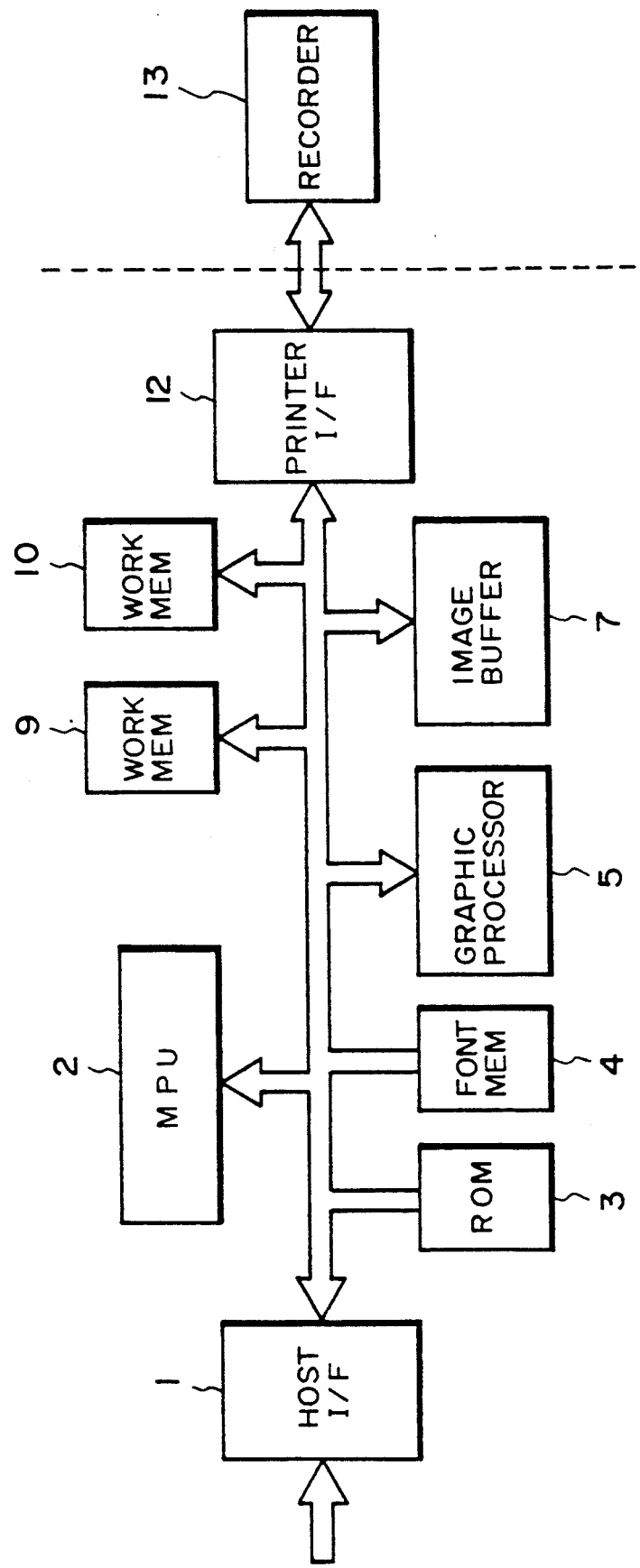
FIG. 8 is a block constructional diagram of a pattern generating apparatus according to the second embodiment.

Description of the Second Embodiment (FIG. 8)

Although the embodiment has been described with respect to the apparatus which integratedly constructs the recorder 8 and the pattern generating section through the bus, the invention is not limited to such a structure.

That is, as shown in FIG. 8, the pattern generating section in the embodiment can be constructed as an independent apparatus provided at an intermediate position between the host computer and the output (recording) device.

In the diagram, a printer interface 12 executes a communication with an independent output device 13. The printer interface 12 executes the reception of resolution data from the output device 13, transmission of the image data (font data) stored in the image buffer 7, and the like. Consequently, there is obtained an effect similar to that the resolution set by the resolution switch 11 is directly read out by the CPU 2 in the first embodiment. According to the second embodiment, since the pattern generating apparatus is independent, various output devices can be connected. Moreover, the size of the printed character can be set to the size as designated from the host computer. Therefore, the application range is wide.

As described above, according to the invention, even if a recorder of a different resolution is connected, a character of a desired size can be recorded without changing the construction of the apparatus itself.

Embodiment to Accurately Reproduce a Color

Explanation will now be described hereinbelow with respect to an embodiment in the case of generating a pattern at an optimum resolution in accordance with the recording device as mentioned above and painting the inside of the outline of the outline font data by the designated color.

Figures 9, 10:
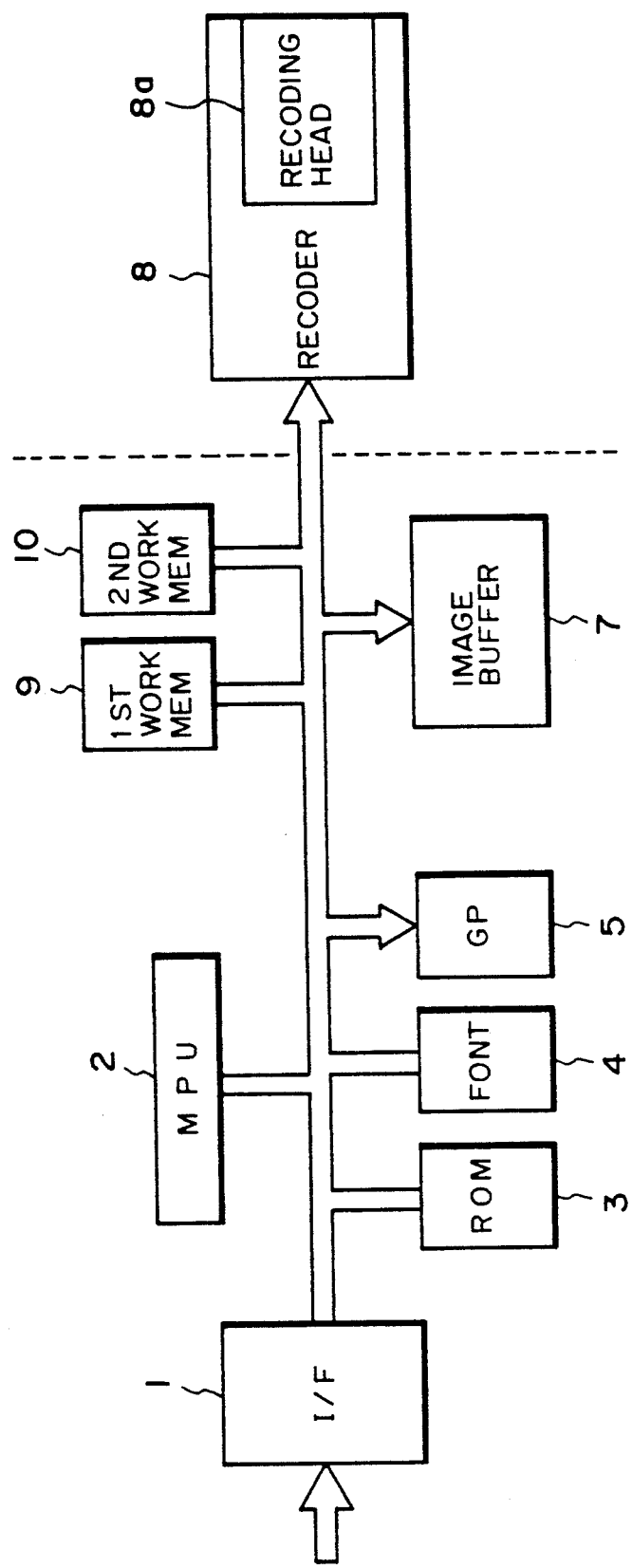
FIG. 9 is a block diagram showing an embodiment of an outline font generating apparatus according to the invention.
FIG. 10 is a diagram showing a masking table for a masking operation by a graphic processor shown in FIG. 9.

FIG. 9 is a block diagram for explaining a construction of an outline font generating apparatus showing such an embodiment of the invention and is substantially fundamentally the same as FIG. 1. In FIG. 9, reference numeral 1 denotes the interface circuit for receiving a printing character code and a control code from an external apparatus and for temporarily storing into a work memory (not shown) in the MPU 2. Control programs including a flowchart, which will be explained hereinlater, to execute the control procedure of the apparatus are stored in the ROM 3. The MPU 2 analyzes the character code and instructs the storing and masking processes of the outline font to the graphic processor (GP) 5 in accordance with the control program.

The GP 5 also functions as storing means, masking processing means, and painting means in the invention. The GP 5 accesses the font memory 4 to store the outline font data in correspondence to a predetermined character code and stores the font image based on the outline font data into the matrix area of one character provided in the first work memory 9. The GP 5 executes the masking process on the basis of the color data which is designated and input in parallel with the storage of the font image and stores as color density data into the second work memory 10. Further, the GP 5 paints the inside of the font image by color density data while comparing the font image and the color density data and generates a color image in which the inside of the outline of a character or a symbol was color corrected into the image buffer 7.

The recorder 8 drives a recording head 8a on the basis of the color image stored in the image buffer 7 and prints the color image of the character or symbol onto a recording medium. A recorder which can output a binary dot image such as ink jet printer or thermal copy transfer printer can be used as a recorder 8. Or, a recorder which can print and output a multi-value image such as a "sublimation" type thermal copy transfer printer can be also used as a recorder 8. On the other hand, the components 2 to 7 can be provided in the recorder 8 or on the work station side and no problem occurs in the application of the invention. A color designation signal which is necessary to store the color image according to the invention can be instructed and input from the host computer or can be previously stored and either one of those methods can be properly selected. The resolution switch 11 and the like can be obviously also provided in a manner similar to FIG. 1.

The first work memory 9 is used to execute the painting process on a character unit basis. The painting pattern based on the outline font data of the character or symbol which was read out by the graphic processor 5 is stored in the first work memory 9. The color data is stored in the second work memory 10 on a character unit basis. One area in the work memory in the MPU 2 can be also used as first and second work memories 9 and 10.

FIG. 2 mentioned above is a diagrammatical view for explaining a structure of the outline font data which is stored in the font memory 4 shown in FIG. 9 and shows the case of, e.g., a character "H".

As will be understood from FIG. 2, the graphic processor 5 stores the font image based on the outline font data into a matrix area of one character (for instance, dot matrix of at most 128×128 dots) provided in the work memory 9 with reference to vector data which uses the outline points $P_0$ to $P_n$ of a character as coordinate values.

FIG. 10 is a diagram showing a masking operation for color correction by the GP 5 shown in FIG. 9. In the diagram, Y, M, and C denote designated color data each having a value of (0 to 255). $a_0$ to $a_8$ indicate masking coefficients. The designated color data and the masking coefficients have previously been set every apparatus or are instructed and input from the host computer Y', M', and C' denote color data after completion of the correction which are calculated by the matrix operation of Y, M, and C and $a_0$ to $a_8$. Although an example of a primary masking has been shown in the embodiment, a higher order masking can be also performed. The masking coefficients have values which have been present so as to accurately reproduce the designated color data on a recording paper. The masking coefficients can be varied in accordance with the kind of ink or the kind or recording paper.

A generating process of the color correction data based on the outline font according to the invention will now be described in further detail with reference to FIGS. 11 and 12.

Figure 4:
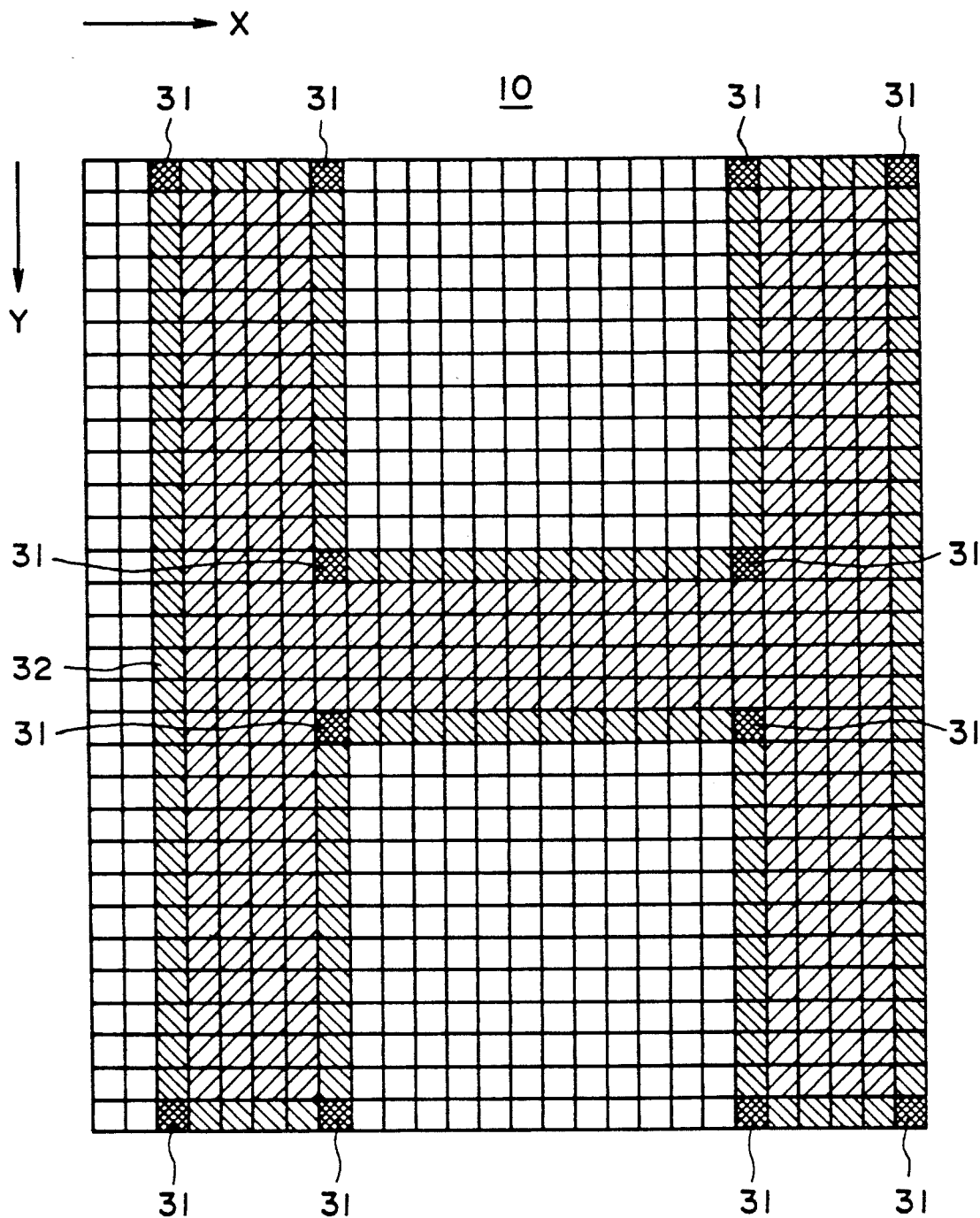
FIG. 4 is a diagram for explaining the generation principle of an outline font.
Figure 11:
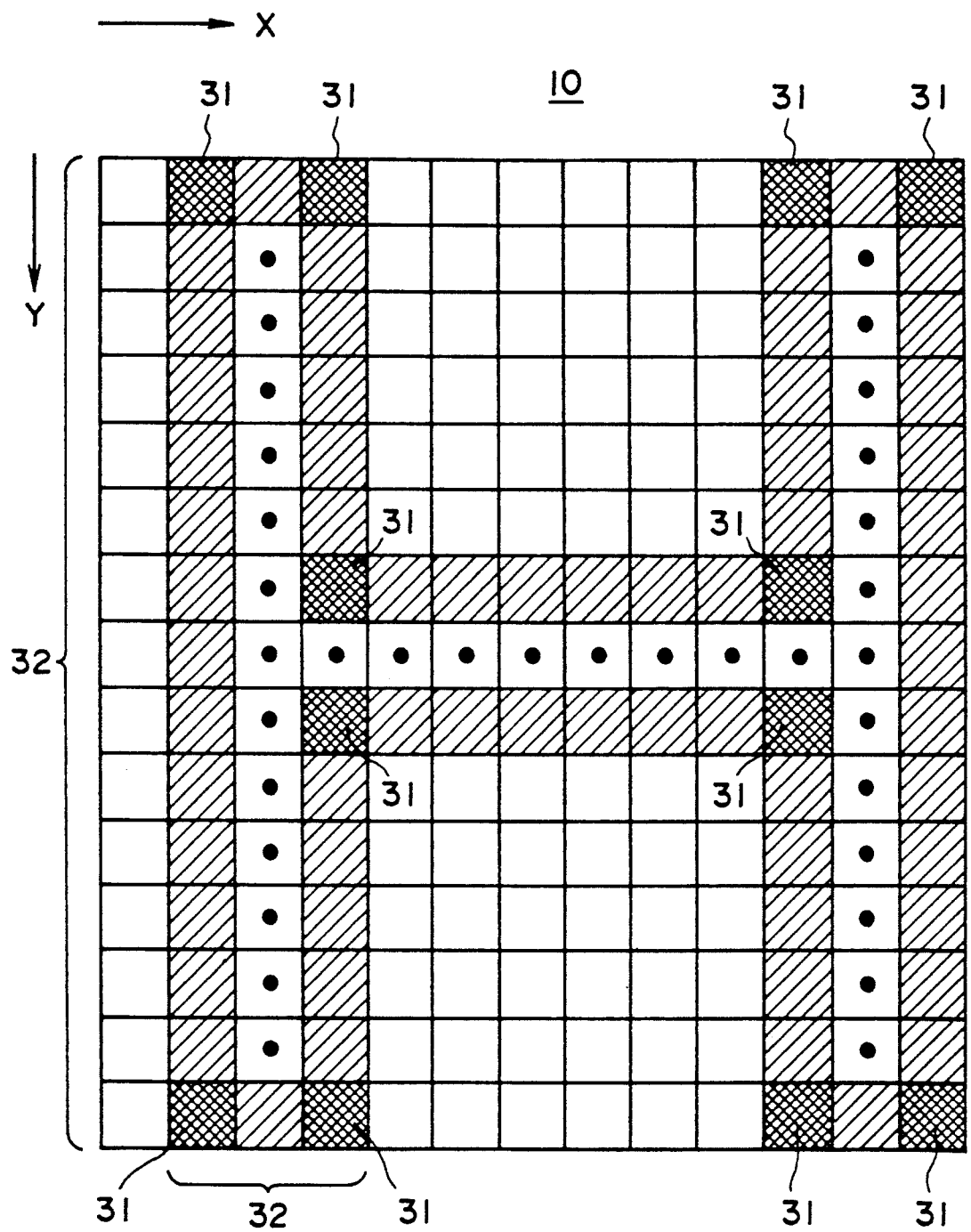
FIG. 11 is a diagrammatical view for explaining an outline path image storing process of an image buffer 7 shown in FIG. 9.

FIG. 11 is a diagrammatical view for explaining an outline path image storing process of the image buffer 7 shown in FIG. 1 and is similar to FIG. 4. Reference numeral 31 denotes the start point of an outline path. The scan path 32 is formed in the work memory by painting the portion between the outline path start points 31. An ordinary painting process for, e.g., a character "H" is completed by painting the inside (· in the diagram) of the portion between the scan paths 32.

After the GP 5 finished the painting process of the outline font in the work memory 9 as shown in FIG. 11, the GP 5 paints the inside of the character "H" by the color density data formed by the above masking operation for the image buffer 7 by referring to the painting data. The values of the masking coefficients $a_0$ to $a_8$ are selected so as to correct the color difference due to a variation of recording heads or a difference of recording papers.

Figures 12, 13:
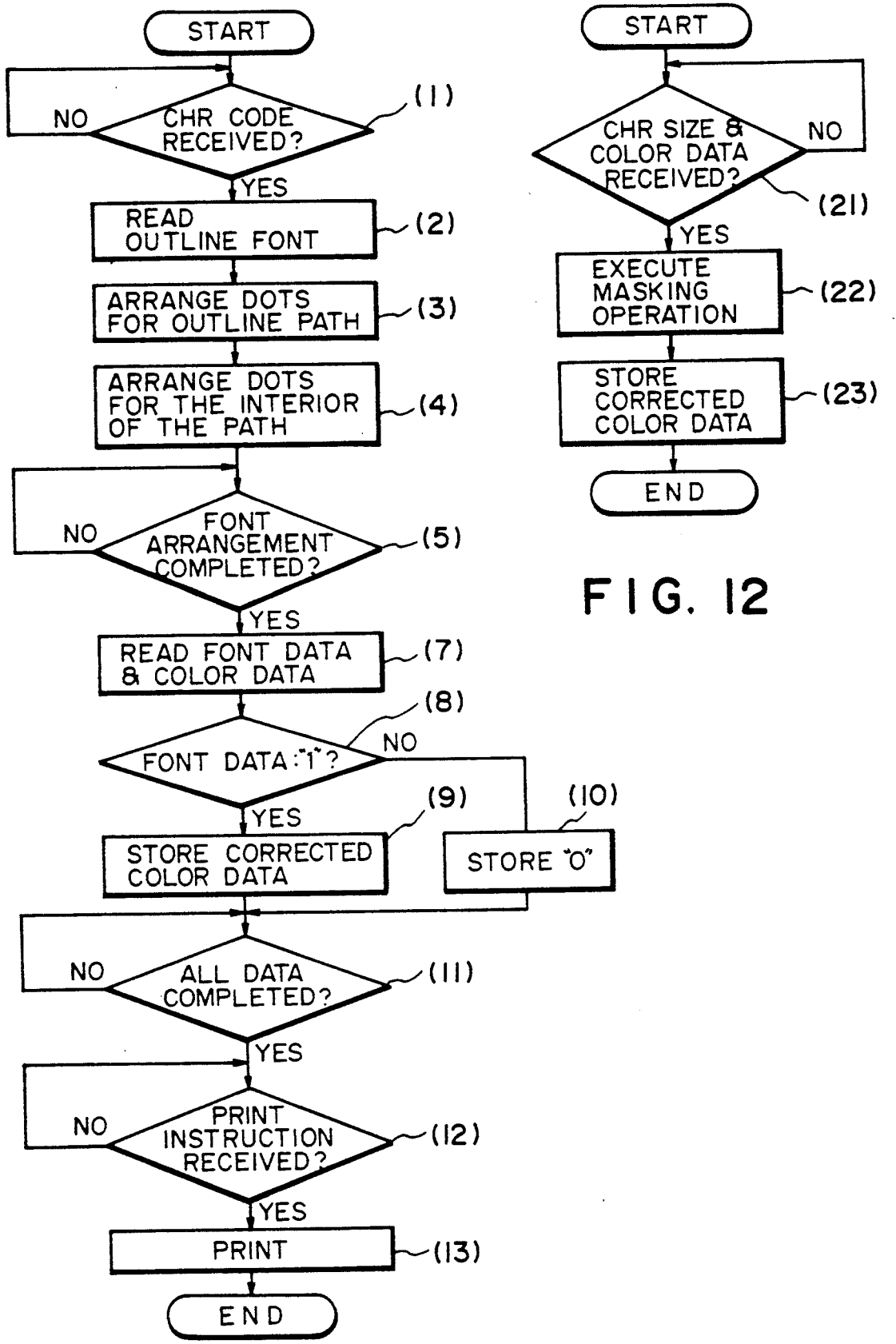
FIG. 12 is a flowchart for explaining an example of a masking processing procedure according to the invention.
FIG. 13 is a flowchart for explaining an example of a character storing processing procedure according to the invention.

FIG. 12 is a flowchart for explaining an example of a masking processing procedure according to the invention. (21) to (23) indicate processing steps.

First, a check is made to see if the graphic processor 5 has received the character size and the color data from the MPU 2 or not in step (21). If YES, the masking operation is executed on the basis of the masking table and the color correction is performed. Then, the corrected color data Y', M' and C' obtained in step (22) are written and stored into the work memory 10 in step (23).

FIG. 13 is a flowchart for explaining a character storing processing procedure according to the invention.

First, a check is made to see if the GP 5 has received the character code from the CPU 2 or not (step 1). If YES, the GP 5 accesses the font memory 4 and reads out the corresponding outline font data (step 2) and stores the dots of the outline path into the first work memory 9 (step 3). Further, the GP 5 paints the inside of the outline path (step 4). A check is then made to see if the font storing process has been completed or not (step 5). If YES, the outline font data of one dot unit stored in the first work memory 9 and the color corrected density data Y', M', and C' stored in the second work memory 10 are respectively read out (step 7). A check is made to see if the outline font data is set to "1" or not every dot (step 8). If YES, the color corrected density data 'Y', M', and C' are stored into the outputting image buffer 7 corresponding to the relevant dot (step 9). If NO in step (8), "0" is stored as Y', M', and C' into the outputting image buffer 7 corresponding to the dot, respectively, (step 10).

A check is then made to see if the storage of all of the density data to output an image has been completed or not (step 11). If YES, a check is made to see if an image output instruction has been input from the MPU 2 or not (step 12). If YES the printing process is executed on the basis of the color density data (step 13) and the processing routine is finished.

Another Embodiment

Figure 14:
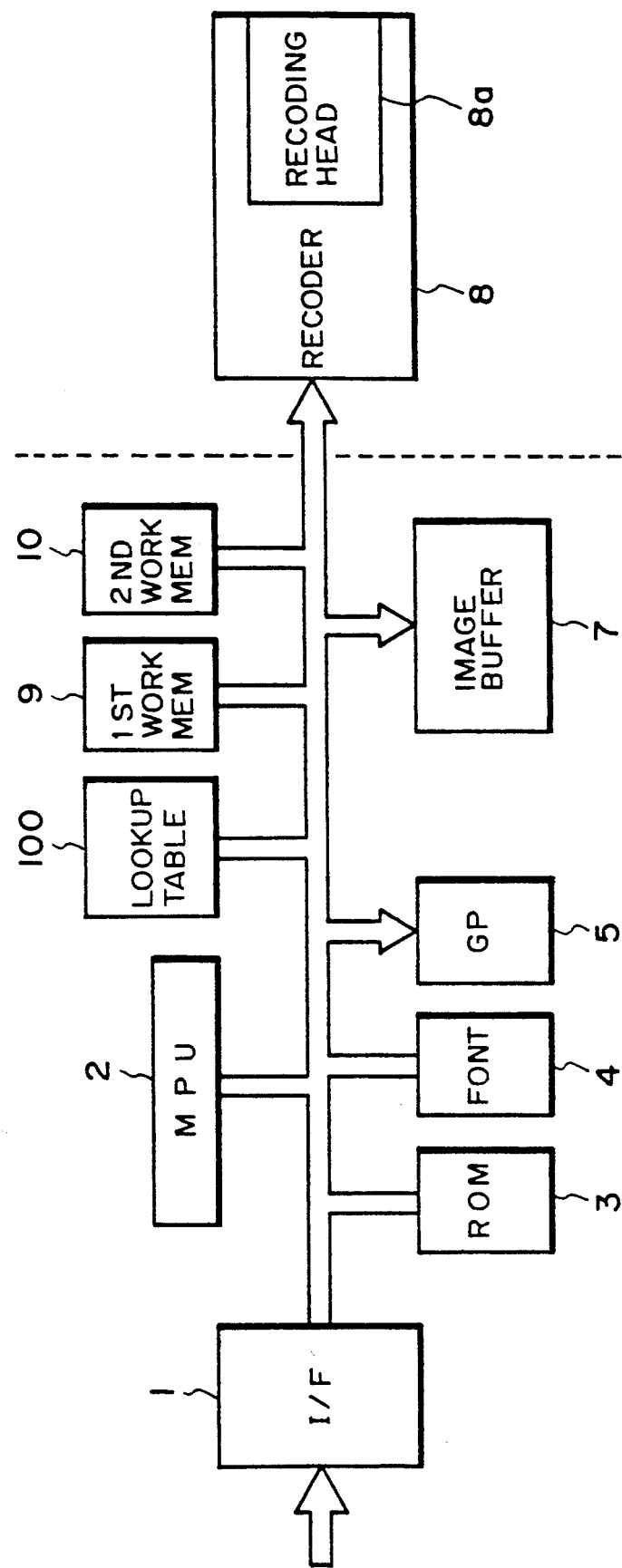
FIG. 14 is a block diagram showing another embodiment of the outline font generating apparatus according to the invention.

FIG. 14 shows the second embodiment of the invention. In the diagram, a lookup table 100 comprises a RAM or a ROM. The density values of the colors of Y, M, and C after the color correction which have previously been calculated are stored in the lookup table 100. In the embodiment, the masking operation shown in FIG. 10 has been executed for only the designated color. However, in this embodiment, the calculations are previously executed for all of the possible values of Y, M, and C and the results of the calculations are stored in the lookup table. In the case of writing the color data after the correction into the work memory 10, by referring to the lookup table 100, an effect similar to that the masking operation which is executed in the foregoing embodiment is derived. As shown in FIG. 8, the printer interface 12 may be also provided. The data which is stored in the lookup table 100 can be exchanged by a ROM. On the other hand, if the lookup table is constructed by a RAM, the data which is stored in the lookup table can be freely changed by executing the calculation by the MPU 2 when the apparatus is made operative or by performing the calculation when the masking coefficients were down loaded from the host computer.

As described above, according to the invention, the inside of the outline of the image based on the outline font data is painted by the color data generated in accordance with the designated color data. Therefore, by using the invention as a recorder, there is obtained an excellent effect such that an image can be recorded by a unique color adapted to the characteristics of the recording element, the color, material, or the like of the recording medium such as paper, and the like.

Constructional Diagram of Printer

Figure 15:
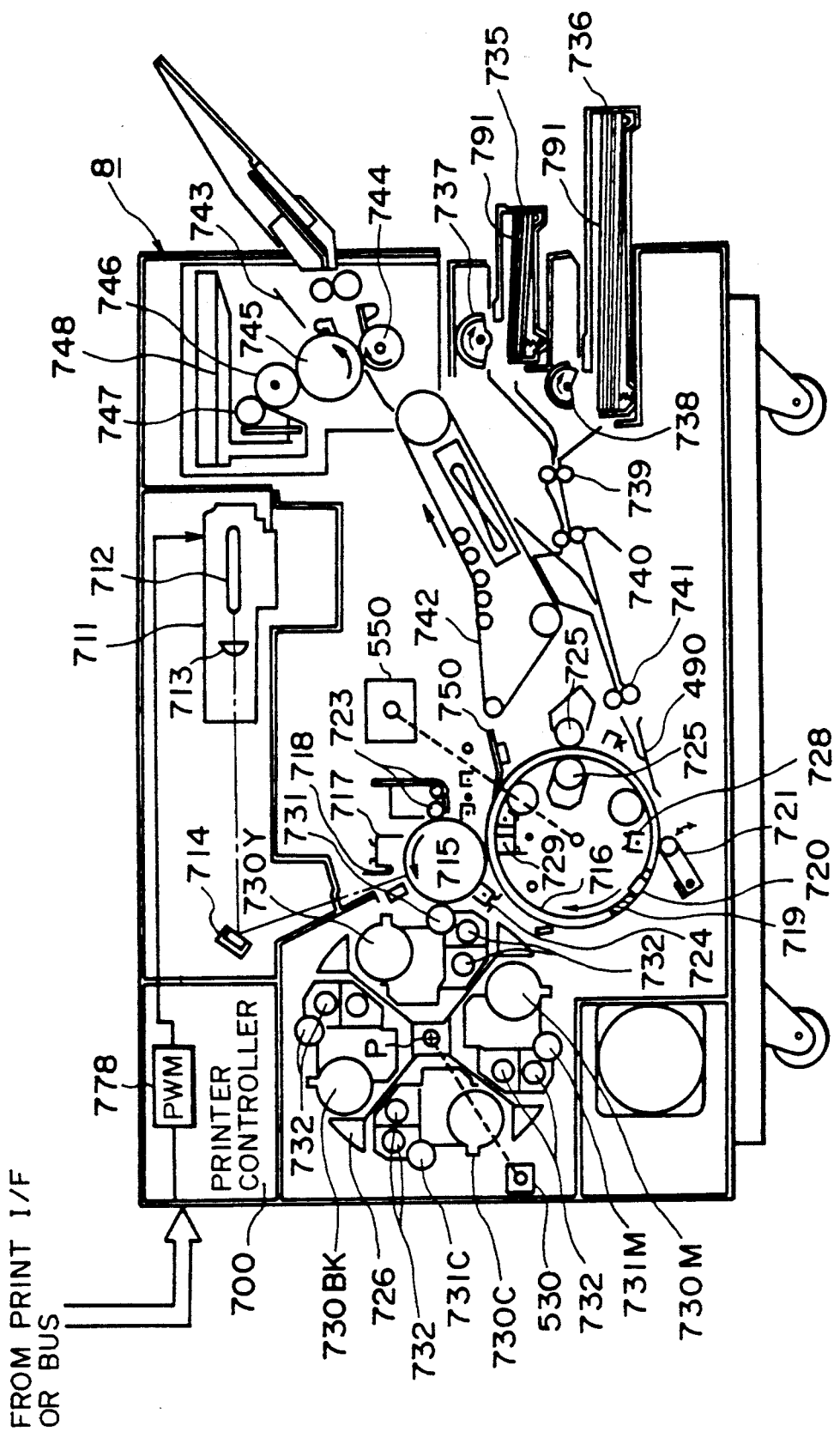
FIG. 15 is a structural diagram of an example of a color printer.

An outline of the printer 8 will now be described with reference to FIG. 15. A pulse width modulating circuit 778 converts a multi-value digital image signal from the printer interface into an analog image signal and compares the analog image signal with a triangular wave of a predetermined period, thereby forming a pulse width modulation signal. The pulse width modulation signal is supplied to a laser output section 711 at the post stage and is used to form a gradation image by on/off modulating a laser beam. Reference numeral 711 denotes a scanner having: the laser output section to convert the image signal from the PWM 778 into the photo signal; a polygon mirror 712 of a polyhedron (for instance, octahedron); a motor (not shown) to rotate the mirror 712; an f/θ lens (image forming lens) 713; and the like. Reference numeral 714 denotes a reflecting mirror to change an optical path of the laser beam and 715 indicates a photo sensitive drum. The laser beam emitted from the laser output section is reflected by the polygon mirror 712 and passes through the lens 713 and mirror 714 and linearly scans (raster scan) along the surface of the drum 715, thereby forming an electrostatic latent image corresponding to an input image.

Reference numeral 717 denotes a primary charging device; 718 a whole surface exposing lamp; 723 a cleaner section to collect any residual toner which was not transferred; and 724 a pretransfer charging device. The above components are arranged around the photo sensitive drum 715.

Reference numeral 726 denotes a developing unit to develop the electrostatic latent image formed on the surface of the drum 715 by the laser exposure; 731Y, 731M, 731C, and 731BK indicate developing sleeves for directly developing the image by coming into contact with the drum 715; 730Y, 730M, 730C, and 730BK are toner hoppers which hold spare toners; and 732 a screw to transport a developing agent. The developing unit 726 is constructed by the sleeves 731Y to 731Bk, toner hoppers 730Y to 730Bk, and screw 732 and these components are arranged around a rotary shaft P of the developing unit. For instance, when a yellow toner image is formed, the yellow toner is developed at the position shown in the diagram. When a magenta image is formed, the developing unit 726 is rotated around the rotary shaft P in the diagram and the developing sleeve 731M in the magenta developing device is arranged at the position where it comes into contact with the photo sensitive drum 715. The apparatus also operates similarly in the development of the cyan and black images.

Reference numeral 716 denotes a transfer drum to transfer the toner image formed on the drum 715 onto paper; 719 indicates an actuator plate to detect the moving position of the transfer drum 716; 720 a position sensor to detect that the transfer drum 716 has moved to the home position by approaching the actuator plate 719; 725 a transfer drum cleaner; 727 a paper pressing roller; 728 a discharging device; and 729 a transfer charging device. The above components 719, 720, 725, 727, and 729 are arranged around the transfer drum 716.

On the other hand, reference numerals 735 and 736 denote paper feed cassettes to enclose papers (cut sheets); 737 and 738 paper feed rollers to feed the papers from the cassettes 735 and 736; and 739, 740, and 741 timing rollers for matching the timings to feed and convey the papers. The paper which was fed and conveyed via those rollers is led to a paper guide 749. A front edge of the paper is gripped by a gripper, which will be explained hereinafter, and wrapped around the transfer drum 716 and the processing is shifted to the image forming process.

Reference numeral 550 denotes a drum rotating motor to synchronously rotate the photo sensitive drum 715 and the transfer drum 716; 750 indicates a peeling-off claw to peel off the paper from the transfer drum 716 after the image forming process was finished; 742 a conveying belt to convey the removed paper; and 743 an image fixing section to fix the paper which was conveyed by the conveying belt 742. The image fixing section 743 has a pair of thermal pressing rollers 744 and 745.

Constructional Diagram of Printer

Figure 16:
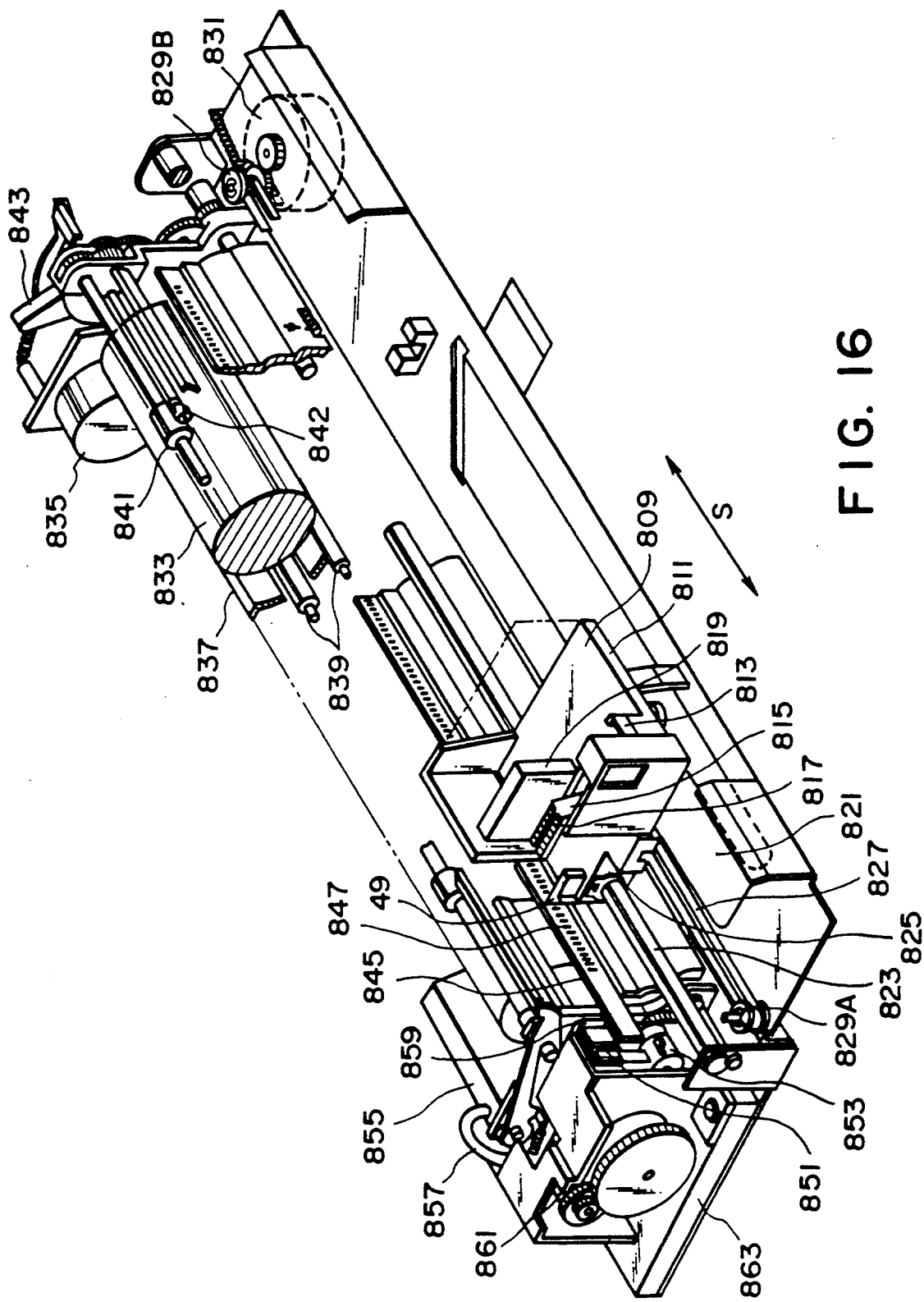
FIG. 16 is a structural diagram of an example of a printer.

FIG. 16 shows an example of a construction of the printer 8 according to the embodiment.

Reference numeral 809 denotes a head cartridge having an ink jet recording head; 811 indicates a carriage to scan the head cartridge in the directions shown by arrows S in the diagram with the head cartridge mounted on the carriage; 813 a hook to attach the head cartridge 809 to the carriage 11; and 815 a lever to operate the hook 813. The lever 815 has a marker 817 which indicates a scale written on a cover, which will be explained later, and makes it possible to read the printing position, setting position, or the like of the head cartridge by the recording head. Reference numeral 819 denotes a supporting plate to support an electric connecting section for the head cartridge 809 and 821 indicates a flexible cable to connect the electric connecting section and a control section of the main body.

Reference numeral 823 denotes a guide shaft to guide the carriage 811 in the S directions. The guide shaft 823 is mounted in a bearing 825 of the carriage 811. Reference numeral 827 denotes a timing belt to which the carriage 811 is fixed and which transfers a force to move the carriage in the S directions. The timing belt 827 is wound between pulleys 829A and 829B arranged on both sides of the apparatus. A driving force is transferred from a carriage motor 831 to the pulley 829B via a transfer mechanism such as gearing or the like.

Reference numeral 833 indicates a platen roller for supporting a recording surface of a recording medium such as a paper or the like (hereinafter, also referred to as a recording paper) and conveying the recording paper upon recording or the like. The platen roller 833 is driven by a conveying motor 835. Reference numeral 837 denotes a paper pan to lead the recording medium from the paper feed tray side to the recording position, 839 indicates a feed roller which is provided on the part-way of the feeding path of the recording medium and presses the recording medium toward the platen roller 833 and conveys it; 841 a discharge roller which is arranged on the downstream of the recording position in the conveying direction of the recording medium and discharges the recording medium toward a discharge port (not shown); 842 a spur which is provided in correspondence to the discharge roller 841 and presses the roller 841 through the recording medium, thereby causing a conveying force of the recording medium by the discharge roller 841; and 843 a release lever to cancel the pressing operations of the feed roller 839, pressing plate 845, and spur 842 when the recording medium is set of the like, respectively.

Reference numeral 845 denotes a pressing plate for suppressing movement of the recording medium at a position near the recording position, thereby assuring contact between the recording medium to the platen roller 833. In the embodiment, an ink jet recording head for recording by emitting an ink is used as a recording head. Therefore, a distance between the ink emitting port forming surface of the recording head and the recording surface of the recording medium is relatively small and must carefully controlled in order to avoid the contact between the recording medium and the ink emitting port forming surface. Therefore, it is effective to arrange the pressing plate 845. Reference numeral 847 denotes a scale written on the pressing plate 845 and 849 indicates a marker attached to the carriage 811 in correspondence to the scale 847. The printing position and setting position of the recording head can be also read by the scale and marker.

Reference numeral 851 denotes a cap made of an elastic material such as a rubber or the like which is arranged so as to face the ink emitting port forming surface of the recording head at the home position. The cap 851 is supported so that is can be brought into contact with and be moved away from the recording head. The cap 851 is used to protect the recording head when not being used to record or to execute an ink emission recovering process of the recording head. The ink emission recovering process denotes a process predischarge such that by driving an energy generating element which is arranged on the inside of the ink emitting port and is used to emit the ink, ink is emitted from all of the emitting ports, thereby eliminating blockages which might interfere with discharge of the ink, such as air bubbles, dusts, and an increase in ink viscosity. The ink emission recovering process also refers to a process that eliminates factors causing defective emission by forcedly discharging the ink from the emitting ports separate from the above procedure.

Reference numeral 853 denotes a pump which is used to apply a suction force to forcedly discharge the ink and to suck the ink collected in the cap 851 when executing the emission recovering process by such a forced discharge or a preemission. Reference numeral 855 indicates a waste ink tank to store the waste ink which was sucked by the pump 853. Reference numeral 857 denotes a tube to communicate between the pump 853 and the waste ink tank 855.

Reference numeral 859 denotes a blade to wipe the recording head and the emitting port forming surface. The blade 859 is movably supported in a position to wipe in the head moving process by projecting the blade to the recording head side and is shifted to a backward position where the blade is not allowed to come into engagement with the emitting port forming surface. Reference numeral 861 indicates a recovery motor and 863 indicates a cam device which receives the motive power which is transferred from the recovery motor 861, thereby driving the pump 853 and moving the cap 851 and blade 859, respectively.

Although not shown practically, the head cartridge 809 has a pin or a mark indicative of resolution data according to each cartridge. For instance, by reading the resolution data by a limiter, a photo sensor, or the like on the supporting plate 819 or the like, the resolution switch 11 shown in FIG. 1 is constructed. The head cartridge 809 can have a memory to store font data. Various kinds of color inks are provided in the head cartridge 809.

We claim:

1. A pattern generating apparatus comprising:
   font memory means for storing outline font data of characters, symbols, and the like;
   image memory means for storing image data based on the outline font data stored in said font memory means;
   storing means for storing a font image based on the outline font data into said image memory means;
   color data generating means for generating color data in accordance with designated color information;
   painting means for painting the inside of the stored font image in accordance with the generated color data;
   print means for printing a pattern of the painted font image; and
   discrimination means for discriminating whether said print means has completed printing of one page of data.

2. An apparatus according to claim 1, wherein the color data generating means executes a masking operation on the basis of the color information which was designated and input and generates the color data.

3. An apparatus according to claim 1, wherein the color data generating means is a non-volatile memory from which color information can be read out in accordance with the designated color information.

4. A pattern generating apparatus comprising:
   memory means for storing a data group in a coordinate form in correspondence to individual characters in order to obtain a character pattern;
   recording means for recording the pattern, said recording means being exchangeably attached to said apparatus;
   fetching means for fetching a resolution corresponding to said recording means which is attached to said apparatus;
   selecting means for selecting a character pattern obtained based on said data group stored said coordinate form in response to the resolution fetched by said fetching means, wherein said selected character is to be painted inside;
   print means for printing said selected character pattern; and
   discriminating means for discriminating whether said print means has completed printing on one page of data.

5. An apparatus according to claim 4, wherein the generating means has a step of generating a pattern of an outline portion of the character pattern to be output and a step to paint the inside of the outline portion.

6. An apparatus according to claim 5, wherein in the painting step, a masking operation is executed on the basis of designated color information and color data is generated.

7. An apparatus according to claim 4, wherein the recording means visualizes and outputs a dot pattern by an ink on the basis of a volume change based on a thermal energy.

8. A method of generating a pattern applicable to an apparatus including a memory in which a plurality of outline font data of characters, symbols, and the like are stored, said method comprising the steps of:
   storing an image data based on the stored outline font data;
   generating a color data in accordance with designated color information;
   painting the inside of the stored image data in accordance with the generated color data; and
   printing a pattern of the painted image data; and
   discriminating whether said printing step has completed printing of one page of data.

9. A method according to claim 8, wherein generating color data is accomplished by masking based on the designated color information which generates the color data.

10. A method according to claim 8, further comprising the step of providing color data generating means which is a non-volatile memory from which the color information can be read out according to the designated color information.

11. A method of generating a pattern applicable to an apparatus including memory means for storing a data group in a coordinate form in correspondence with individual characters in order to obtain a character pattern, and providing recording means for recording the character pattern, the recording means being exchangeably attached to the apparatus, said method comprising the steps of:

fetching a resolution corresponding to said recording means which is attached to said apparatus;

selecting a character pattern obtained based on said stored data group in said coordinate form in response to the fetched resolution, wherein the selected character pattern is to be painted inside;

printing the selected character pattern; and discriminating whether said printing step has completed printing of one page of data.

12. A method according to claim 11, wherein the step of selecting a character pattern further comprises:

generating a pattern of an outline portion of the character pattern to be output; and painting the inside of the outline portion.

13. A method according to claim 12, wherein the step of painting further comprises executing a masking operation based on designated color information and generating color data.

14. A method according to claim 11, wherein said recording means operates by visualizing and outputting a dot pattern by an ink based on a volume change based on a thermal energy.

* * * * *